G. E. ELIA.
DEVICE FOR USE IN CONNECTION WITH NAVAL WARFARE.
APPLICATION FILED MAR. 10, 1908.

984,420.

Patented Feb. 14, 1911.
6 SHEETS—SHEET 1.

Witnesses:
F. E. Nares.
M. Herskovitz.

Inventor
Giovanni Emanuele Elia
by his atty
Edward S. Beech

G. E. ELIA.
DEVICE FOR USE IN CONNECTION WITH NAVAL WARFARE.
APPLICATION FILED MAR. 10, 1908.

984,420.

Patented Feb. 14, 1911.

G. E. ELIA.
DEVICE FOR USE IN CONNECTION WITH NAVAL WARFARE.
APPLICATION FILED MAR. 10, 1908.

984,420.

Patented Feb. 14, 1911.

Witnesses:
F. E. Nares.
M. Korskovitz.

Inventor:
Giovanni Emanuele Elia
by his atty
Edward S. Beach

G. E. ELIA.
DEVICE FOR USE IN CONNECTION WITH NAVAL WARFARE.
APPLICATION FILED MAR. 10, 1908.

984,420.

Patented Feb. 14, 1911.

G. E. ELIA.
DEVICE FOR USE IN CONNECTION WITH NAVAL WARFARE.
APPLICATION FILED MAR. 10, 1908.

984,420.

Patented Feb. 14, 1911.

G. E. ELIA.
DEVICE FOR USE IN CONNECTION WITH NAVAL WARFARE.
APPLICATION FILED MAR. 10, 1908.

984,420.

Patented Feb. 14, 1911.

UNITED STATES PATENT OFFICE.

GIOVANNI EMANUELE ELIA, OF LONDON, ENGLAND.

DEVICE FOR USE IN CONNECTION WITH NAVAL WARFARE.

984,420.

Specification of Letters Patent. Patented Feb. 14, 1911.

Application filed March 10, 1908. Serial No. 420,162.

*To all whom it may concern:*

Be it known that I, GIOVANNI EMANUELE ELIA, a subject of the King of Italy, residing at 3 St. James Square, Holland Park Avenue, in the county of London, England, have invented certain new and useful Improvements in or Relating to Devices for Use in Connection with Naval Warfare, of which the following is a specification.

This invention relates to devices for use in connection with naval warfare.

At the present time there are two principal methods employed in naval warfare for attacking the vessels of an enemy; first, by means of shells fired from guns, and secondly, by means of various kinds of torpedoes. A projectile can only damage a part of the ship above the water line, and an automobile torpedo can only attack the ship at a single point below the water. Certain ships like the *"Dreadnought"* have armor plate of such thickness that they are invulnerable to the shock of existing projectiles, and the submerged portion of these vessels is divided into large watertight compartments in such a manner that the explosion of an automobile torpedo has relatively little effect upon the ship, this action being limited to a small number of water-tight compartments, so that the ship retains its power of flotation even when the compartments thus affected fill with water.

The devices that form the subject of this invention are founded upon quite a different principle. The ship, instead of being attacked at points either above or below the water line, is subjected to the action of a long linear floating charge of explosive which becomes applied to the front and side of the ship by the motion of the latter or if the ship is stationary the said linear charge of explosive may be placed in a suitable position relatively thereto. The said charge of explosive is adapted to extend a considerable distance along the sides of the ship, and beneath its belt of armor plating, under conditions which are such that when the said charge explodes, it exerts a powerful action upon a large number of the ship's watertight compartments, thereby insuring the destruction of the floatability and stability of the ship whatever its size, whether it is a powerful cruiser, a submarine, a torpedo boat, or a ship of any other type.

In principle, my invention consists in arranging in the path of the enemy's ship or fleet, an appropriate kind of strong cable containing an explosive charge and having at certain points in its length, devices that are adapted to be operated electrically or mechanically to detach and isolate an appropriate length or section of the explosive cable when a ship comes into contact with it, the portion or section of the cable thus detached being sufficient to effectually embrace the sides of the ship and when exploded to destroy it more or less completely. The other or main part of the cable remains in fighting trim, ready to destroy other ships in a similar manner. These means of destruction cannot only be arranged in the path of the enemy's ships or fleets, but also can be applied by means of shells, against the ships or fleets moored in a harbor or stationary in the open sea. The explosive cable may be laid in the water by means of a submarine or other kind of ship.

In order that the said invention may be clearly understood and readily carried into effect, I will now describe the same more fully with reference to the accompanying drawings, in which:—

Fig. 16ª is similar to Fig. 16, but shows the two fittings separated.

Figure 1:
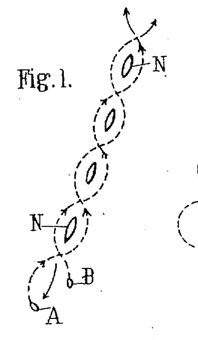
Figures 1, 2, 3 and 4 represent diagrammatically in plan a number of ships around or in the path of which the explosive cable has been laid.

The manner in which the cable would be laid in the path of the ships would depend to a large extent upon the order or formation in which the ships are steaming. In Fig. 1 for instance the ships N are supposed to be navigating in single line. In this case submarines carrying the necessary length of the explosive cable may be caused to plunge or dive at the points A and B. They would then proceed toward the ships and outflank them, each of the submarines leaving in the water (as shown by the broken lines) an explosive cable provided with its accessories and connections and capable of effecting at the appropriate moment, by the operation of suitable contacts or the like, the separation of certain lengths or sections of the explosive cable, all of which are capable of causing a powerful explosion. In this way the ships would be surrounded by an explosive circle from which each ship would be unable to pass without encountering on every side a cable, which would produce an explosion or explosions when the ship collided with it.

Figure 2:
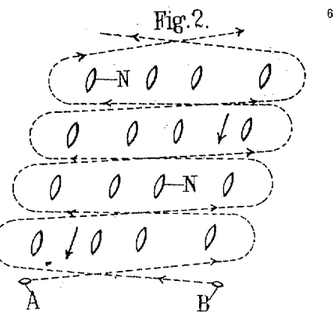

If the ships, instead of being navigated in single file as in Fig. 1, are being navigated in several lines abreast, as shown in Fig. 2, the submarine in laying the explosive cable will traverse the course represented by the broken lines. It is obvious that the number of submarines employed in laying the cable will depend upon the velocity and the number of the enemy's ships. It is far easier for submarines to lay a cable which envelops an entire fleet than to launch a torpedo against a single vessel, because in order to launch a torpedo the submarine must see the vessel and have at least its periscope above water.

Figure 3:
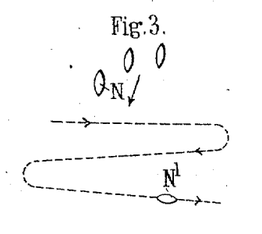

A torpedo boat, destroyer, cruiser or merchant vessel can, as shown in Fig. 3, readily lay an explosive cable in the path of a naval force and can do so far more easily and less dangerously than by approaching sufficiently near to a fleet to be able to launch a torpedo.

Figure 4:
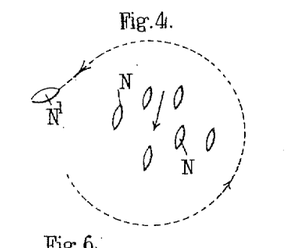

It will be understood that a large vessel will be able to envelop a fleet beyond the horizon visible to the said fleet and thus lay an explosive cable which the ships of the fleet must encounter before they can leave the danger circle thereby formed around them such as shown diagrammatically at $N^1$ in Fig. 4.

The operations which have been above described as easy to carry out in the open sea for attacking fleets, are still more easy of execution for the defense of ports or for the defense of a fleet in a roadstead. The explosive cable, which thus constitutes a protecting barrier, may be moored very readily some kilometers in front of the fleet to be protected. It will serve to destroy torpedo boats and submarines which might attempt to attack the fleet protected by this barrier.

Figures 5, 7, 11:
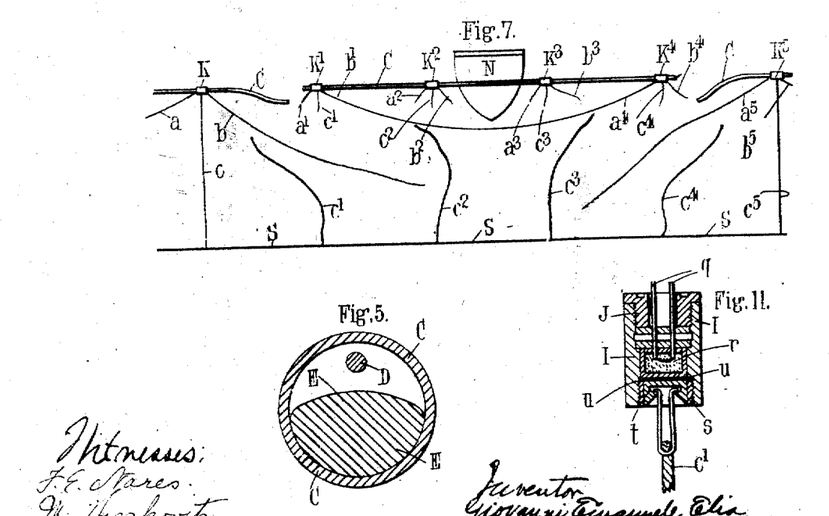
Fig. 5 is a cross section of the aforesaid cable.
Figs. 6, 7 and 8 represent diagrammatically in elevation three stages in the encounter of a ship with a length of the explosive cable.
Fig. 11 is a section of a fuse forming part of the said cable.

One form of the explosive cable which as above described, is intended to be applied against the sides of a ship, when encountered by the latter, is shown in cross section in Fig. 5. It comprises an india rubber tube C inclosing a steel cable D which is not taut but preferably sinuous spiral or undulated so that when in the india rubber tube, it occupies a length shorter by some meters than its actual length when taut or developed. The tube C is of such a character that it can only be stretched or broken under the influence of great strains such as those produced by a ship in traversing it, this characteristic thus constituting the safety of the system and of the cable D during the operations of mooring and taking up. The said tube C incloses an explosive charge E which extends throughout its entire length.

I will now describe how the striking of the ship against the cable causes, either electrically or by explosion, the separation of a length or section of the cable, which is carried along by the vessel, and becomes applied to its sides at the end of a certain period (a few seconds only) which is time enough for the cable to become thoroughly applied to the lower vulnerable part of the ship.

Figure 6:
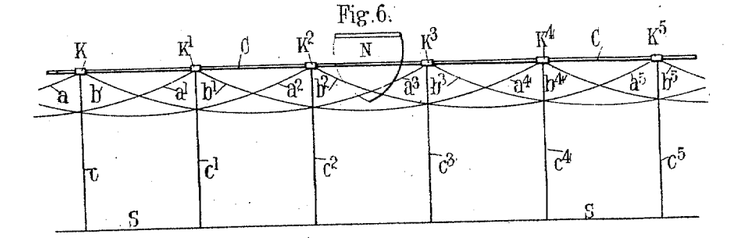

I will refer first to the arrangements for separating the cable into lengths or sections by electrical means, reference being had more particularly to Fig. 6. The cable is provided at various points in its length with electrical devices K, $K^1$, $K^2$, $K^3$, $K^4$, $K^5$, etc., having contacts which are arranged to permit electric currents to pass to explosive fuses and by the explosion of the latter to produce the separation of steel cables the ends of which are designated $a$ and $b$ on the device K, $a^1$ and $b^1$ on $K^1$, $a^2$ $b^2$ on $K^2$ and so on in succession. The ends of each of these steel cables are separated by three times the space between any two adjacent electrical devices on the explosive cable C. In addition to the cables above mentioned pendant cables $c$ $c^1$ $c^2$, etc., are suspended from the aforesaid electrical devices and connected one with the other at the lower ends by a cable S which serves to join the two outer parts of the explosive cable when an intermediate portion has been detached from the whole, by encounter with a ship, as will hereinafter be explained.

The explosive cable C is adapted to float on the water and is thus quite invisible at a distance from ships moving toward it in the day-time; it is only when some meters away that it can be seen, and, as it is then too late to return, the ship will be obliged to strike against the cable and be sunk by it. At night-time nothing of this cable can be seen even at a short distance.

Figure 8:
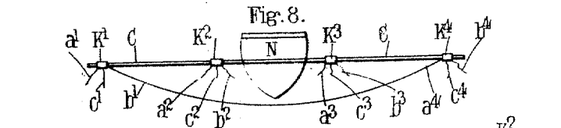
Figure 9:
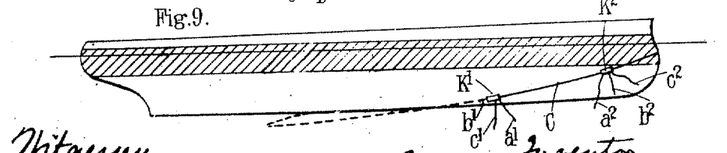
Fig. 9 is a side elevation of the ship showing the explosive cable being dragged along by the ship near the vulnerable parts of its hull.

Assuming for example that the ship N encounters the explosive cable C between the electrical devices $K^2$ and $K^3$ as indicated in Fig. 6, the ship will first of all cause the elongation or rupture of the india rubber tube C and will draw out or extend the steel cable D (Fig. 5); the pull exerted upon this cable after its extension will act upon the two electrical devices located at $K^2$ and $K^3$ and cause their contacts to be closed, and electric current to pass to the explosive fuses, whereby the latter are exploded and consequently cause the rupture of the steel cables $a^2 b^2 c^2$; $a^3 b^3 c^3$; $a^1 c^1$; and $b^4 c^4$. In addition to this, the explosive cable C will be broken on the left of $K^1$ and on the right of $K^4$. These conditions are shown in Fig. 7. The ship is then accompanied (see Fig. 8) by a length of the explosive cable C and by the steel cable $b^1 a^4$ extending between the two devices $K^1 K^4$. On reference to Fig. 9 it will be seen that the explosive cable C becomes applied to the front and sides of the hull of the ship as it moves forward, the steel cable $b^1 a^4$ being beneath the ship, that is to say adjacent to its vulnerable part. The explosive charge (E, Fig. 5) of the cable C explodes a few seconds (say ten to fifteen or more) after the ship has struck the cable so that the cable has had time enough to become applied against the ship in proportion as the latter advances, the ignition of the charge in the explosive cable being produced by a time fuse under conditions which will be hereinafter explained.

Figure 10:
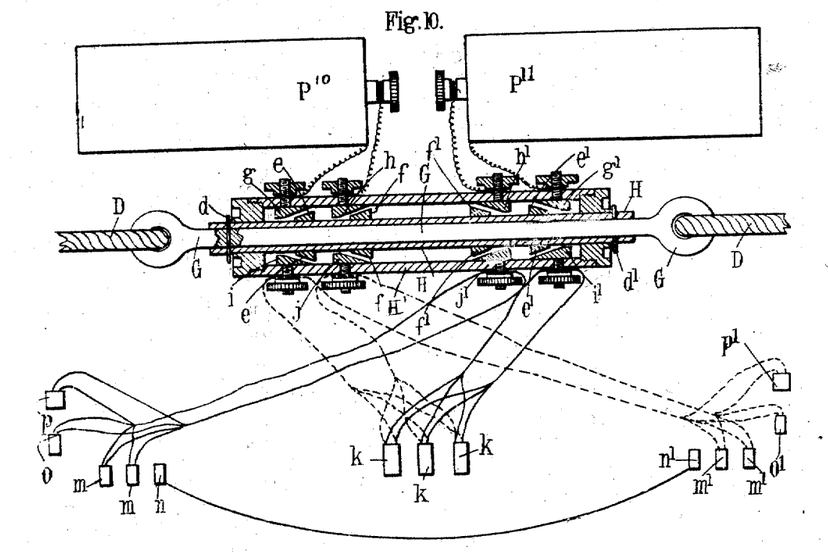
Fig. 10 is a detail sectional elevation of one of a series of electrical devices used for detaching a length of the cable as aforesaid.

Each of the aforesaid electrical devices K $K^1$ $K^2$, etc., one of which is shown in detail at Fig. 10, comprises a rod G surrounded by a sleeve of insulating material H fixed in position on the rod G by pins $d d^1$. The rod G terminates in eyes to which the steel cable D of the explosive cable is secured. Upon the sleeve H there are mounted conical contact pieces $e f$, $e^1 f^1$ intended to come into contact with the corresponding contact pieces $g h i j$ on a sleeve $H^1$ on the one hand and $g^1 h^1 i^1 j^1$ on the other hand. The parts $g h$ and $g^1 h^1$ are electrically connected with the poles of the batteries $P^{10}$ $P^{11}$ and the parts $i j i^1 j^1$ are electrically connected with the fuses or detonating devices. The batteries $P^{10}$, $P^{11}$ and sleeve $H^1$ are secured to the rubber tube or casing of the cable. For the electrical device located at $K^2$ (Fig. 6) the fuses $k$ (Fig. 10) correspond with the three steel cables $a^2 b^2 c^2$ (Fig. 6); those at $m$ (Fig. 10) correspond with the two cables $a^1$ and $c^1$ which terminate at $K^1$ (Fig. 6) and those at $m^1 m^1$ (Fig. 10) correspond with the cables $b^4$ and $c^4$ which terminate at $K^4$ (Fig. 6).

$n n^1$ (Fig. 10) are releasing devices between which the cable $b^1 a^4$ (Fig. 6) is situated and which are not influenced by the devices $K^2$ and $K^3$ (Fig. 6).

$o o^1$ (Fig. 10) are releasing devices which are influenced by the devices $K^2$ and $K^3$ (Fig. 6) and which cause the rupture of the explosive cable C on the left of $K^1$ and on the right of $K^4$. Finally $p p^1$ (Fig. 10) represent releasing devices with time fuses which are intended to ignite the charge of explosive in the portion or section of the cable C which has been separated from the main portion of the cable by the collision of the ship against it.

It will be understood that when a ship in passing between $K^2$ and $K^3$ (Fig. 6) encounters the explosive cable, the rubber tube or casing is broken at the place of impact and the drag or pull of the ship is imparted to the yielding steel cable D, this cable acts upon the rods G (Fig. 10) of the electrical devices $K^2$ and $K^3$ (Fig. 6) and assuming with reference to Fig. 10 that the pull on the rod G of the device $K^2$ (Fig. 6) is toward the right hand, the left hand pin $d$ will be sheared owing to its coming into contact with the end of the sleeve $H^1$ which remains fixed to the rubber tube or casing, and the conical contact pieces $e^1 f^1$ will come into contact with the pieces $g^1 h^1 i^1 j^1$; thus closing the electric circuit through the battery $P^{11}$ and effecting the explosion of the fuses $k k k m m o p$. At the same time a pull will be exerted on the rod G of the electrical device $K^3$ (Fig. 6) toward the left hand and the right hand pin $d^1$ will be sheared, thus causing the conical contact pieces $e f$ of the said contact device $K^3$ (Fig. 6) to come against the pieces $g h i j$; current will then flow from the battery $P^{10}$ through the circuits indicated by the dotted lines and will thus cause the fuses $k k k$ of the device $K^3$ (Fig. 6) and the fuses $m^1 m^1$, $p^1$ and $o^1$ to be exploded. The devices $K^2$ and $K^3$ (Fig. 6) having been thus operated, the conditions will be those represented in Fig. 7.

In Fig. 11 I have shown in detail one form of explosive fuse suitable for the purpose above referred to. It comprises a box I into which are screwed plugs J traversed by two electrical conductors $q q$ connected one with the other by a platinum or other wire embedded in the explosive material $r$ of a cartridge. Into the other extremity of the body I there is screwed a plug $s$ which by bearing against the flange or collar $u$ of a disk $t$ serves as a support for the said disk. In the disk $t$ one of the cables $a^1 b^1$ or $c^1$ (Fig. 6) is engaged. When the charge of the cartridge $r$ explodes under the action of the ignition due to the passage of the electric current through the conductors $q$ and the consequent heating of the wire connecting them, the flange or collar $u$ is broken and the disk $t$ expelled by the explosion so that the cable is disengaged.

Figure 12:
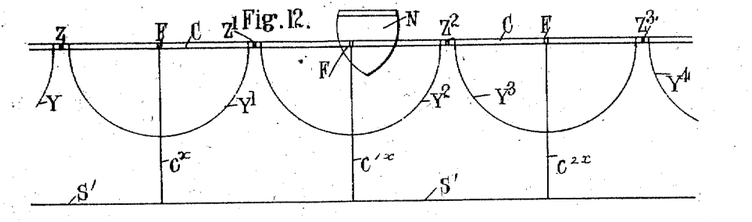
Figs. 12 and 13 illustrate diagrammatically in elevation two stages in the operation of a modified arrangement of the cable.
Figure 13:
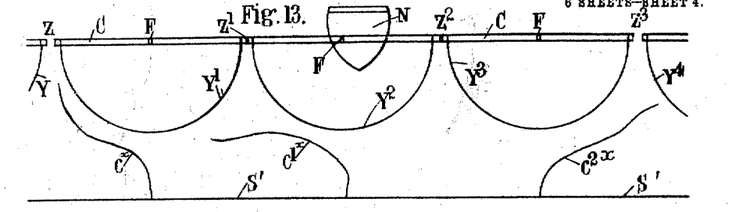
Figure 14:
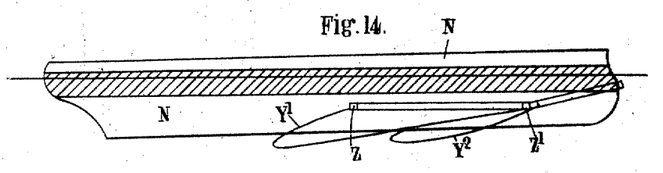
Fig. 14 shows the same applied to the hull of a ship which has come in collision with the said cable.

Having described the method of separating a section or length of the explosive cable by electrical means, I will now describe a method of separating a section or length of the cable by explosions and of igniting the charges contained in the explosive cable, by a flame obtained by mechanical means such as a firing pin driven by a spring against a detonator by the flash of which a burning composition is ignited and supplies the flame for exploding the cable. Such an arrangement is shown in Figs. 12, 13 and 14 and in further detail in Figs. 15 to 18.

The different sections or lengths of the explosive cable (each of which is about twenty meters long) are formed or provided midway of their length with a box or compartment F (Fig. 12) to which there is attached a cable such as $c^x$ $c^{1x}$ or $c^{2x}$. These cables $c^{1x}$, $c^{2x}$ are connected at their lower ends by a cable $S^1$. The sections or lengths of the explosive cable are provided at their extremities with explosive devices or fittings Z, $Z^1$, $Z^2$, $Z^3$, etc. At the adjacent ends of any two sections or lengths, these fittings are connected with one another by a transverse pin X (Figs. 15 and 16), which passes through a male and female interlocking part R $R^1$ and is held in place by a ring or link $x^1$ at one end of said pin and a protuberance $x^2$ at the other end.

The fitting at any one end of a section or length of the explosive cable constitutes in reality only one half of the device; each half fitting is united symmetrically to another half fitting by fixing the two interlocking parts R $R^1$ together by the spindle X.

Cables Y $Y^1$ $Y^2$ $Y^3$ $Y^4$, etc., (Fig. 12), are arranged in the water beneath the explosive cable C and between the explosive fittings Z $Z^1$ $Z^2$. When, as shown in Figs. 12 and 13 for example a ship passes between $Z^1$ and $Z^2$, rupture of the connection between two extreme fittings Z and $Z^3$ of the sections of the explosive cable takes place, as shown in Fig. 13; at the same time the cables $c^x$ $c^{1x}$ $c^{2x}$ are disconnected from those of the compartments F that are situated between the said fittings Z and $Z^3$. The result is that the ship will carry along with it on its front part, the section or length of the explosive cable between $Z^1$ $Z^2$, as shown in Fig. 13; the part Z $Z^1$ lying on one side of the ship and the part $Z^2$ $Z^3$ lying on the other side, the steel cable $Y^2$ coming beneath the ship in front, and the cables $Y^1$ $Y^3$ at the sides. The result will be that the part $Z^1$ $Z^2$ of the explosive cable will be immersed below the armored part of the ship and the two parts Z $Z^1$, $Z^2$ $Z^3$ will become extended over the ship's sides below the armored part and will be kept approximately horizontal by reason of the weight of the cable $Y^2$ which passes beneath the ship. This arrangement of the explosive cable in front of the ship and against its sides is therefore admirably adapted to insure the certain destruction of the ship when the cable explodes. If a submarine strikes the cable $Y^2$ the pull exerted on said cable is communicated to the parts $Z^1$ $Z^2$ of the floating cable, so that the system acts in the same way as if the floating cable were encountered directly.

Figure 15:
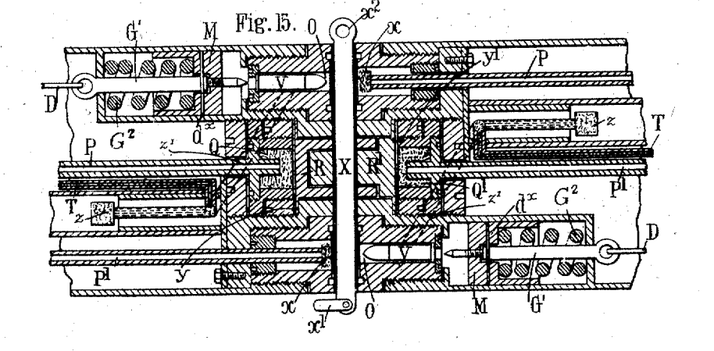
Figs. 15 and 16 are detail longitudinal sections of fittings used with this form of the cable for connecting the lengths or sections of the cable and containing explosive devices for causing the separation of a length or section of the cable at the required parts.
Figure 16:
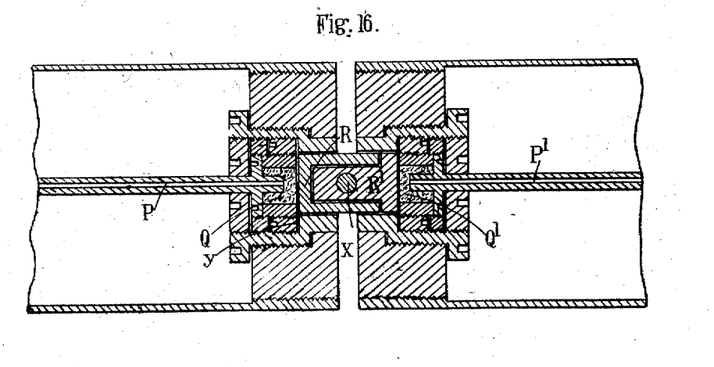
Figure 17:
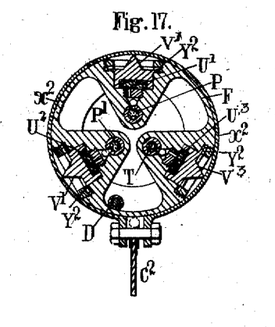
Figs. 17 and 17ᵃ are detail sections of another device for causing separation of the lengths or sections of the cable.
Figure 17A:
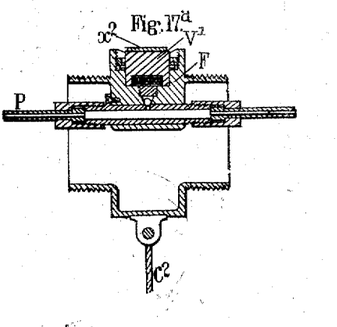
Figure 18:
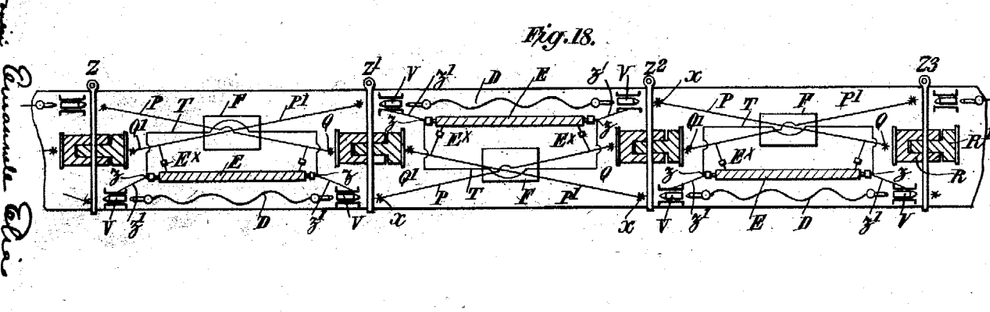
Fig. 18 illustrates diagrammatically a cable and its accessories at four points in its length.

Each of the end fittings of a section of the explosive cable incloses a percussion rod $G^1$ to which a steel cable D is attached as shown in Fig. 15 which represents the fitting, at, say, $Z^2$. This rod $G^1$ is connected to a head M by means of a pin $d^x$ the said head being furnished with a firing pin or striker. A spring $G^2$ is situated between the said head and the bottom of a box or casing which guides the head and its striker. In front of the striker a recess O is provided for the reception of a cartridge V. At a point directly facing the cartridge V and within the adjacent half of the said fitting is arranged an explosive priming $x$ arranged at the extremity of a tape fuse which in the right hand half of the figure is represented by P and extends to the fitting $Z^3$ (Fig. 18). The left hand half of the fitting is provided with a similar percussion rod $G^1$ and cartridge V, and a diametrically opposite explosive priming $x$ at the extremity of a fuse $P^1$ which extends to the fitting at $Z^1$. The cartridge V of each half of the fitting is directly opposite the priming $x$ of the other half. The pin X is shown in Fig. 15 as being situated diametrically in the plane of the section, but is in reality displaced angularly to an extent sufficient to allow clearance between the cartridge V and primer $x$. When the part $Z^1$ $Z^2$ of the explosive cable is encountered by a ship and the steel cable D is pulled, the spring $G^2$ is compressed, and ultimately the pin $d^x$ breaks thereby allowing the striker and head M to fly forward and strike the cartridge V, which explodes and fires the primer $x$ facing it and belonging to the fuse P. The tape fuse P extends along the inside of the explosive cable to the fitting $Z^3$, which, as shown in Fig. 18, is located at the other extremity of the section of the cable that is to be detached. The said tape fuse terminates in a cartridge Q similar to that shown in Fig. 15 arranged behind a box-socket R which receives a stem $R^1$ forming part of the adjacent fitting; it is by the engagement of the stem $R^1$ with the box socket R and the passage of the transverse pin X through both of them that the adjacent fittings of two sections of the explosive cable are connected together as aforesaid. The box socket R is provided with a flange $y$ (Fig. 15) and the stem $R^1$ with a flange $y^1$ (Fig. 15). When the cartridge Q or $Q^1$ explodes, the flange $y$ or $y^1$ is sheared from the part R or $R^1$ and the particular section of the explosive cable is thus separated at $Z^3$ from the main portion as shown in Fig. 16$^a$. In each section of the explosive cable there is therefore a tape fuse P (Fig. 18) extending from the primer $x$ of one fitting, to the cartridge Q at the middle of the fitting at the other extremity of this section of the cable, and another tape fuse $P^1$ which extends from this last mentioned fitting and terminates at the median cartridge $Q^1$ of the first mentioned fitting. Finally there is also in each section of the explosive cable another central tape fuse T extending between the two extreme fittings. This fuse T terminates at the time fuse $z$ intended for igniting the explosive charge of the cable, this time fuse $z$ being fired through the passage $z^1$ which terminates at the cartridge box O. These three tape fuses P $P^1$ and T, which thus extend through the entire length of each section of the cable, traverse the intermediate compartments F which support one of the vertical cables $c^x$ $c^{1x}$ $c^{2x}$, as shown diagrammatically in Fig. 12 and in section in Figs. 17 and 17$^a$. The three tape fuses P, $P^1$, T, Fig. 17, ignite the cartridges $U^1$, $U^2$, $U^3$ in the compartment F and the explosion of these cartridges serves to expel the plugs $V^1$, $V^2$, $V^3$ which are normally held by a shoulder or flange $Y^2$. Each of the plugs $V^1$, $V^2$, $V^3$ has its outer extremity formed with a sharp edge to effect the rupture of or to cut through the circular copper band $x^2$ to which the cable $c^x$, $c^{1x}$ or $c^{2x}$ is attached. Only one however, of the three cartridges in any one compartment F is ignited, depending upon which section of the cable is struck by the vessel. If a ship strikes the explosive cable between $Z^1$ and $Z^2$ (Figs. 12 and 18), the only one of the three fuses P $P^1$ T that is fired in the compartment F located between $Z^1$ and $Z^2$ is the fuse T, so that the band $x^2$ and hence also the cable $c^{1x}$ are detached by means of the plug $V^3$ only. The striking of the vessel between $Z^1$ and $Z^2$ also causes the ignition of the fuse P in the section $Z^2$ $Z^3$ and hence the band $x^2$ and cable $c^2$ are detached by means of the plug $V^1$ in the compartment F pertaining to the section $Z^2$ $Z^3$. Similarly the ignition of the corresponding fuse $P^1$ in the compartment F of the section $Z Z^1$ causes the band $x^2$ and cable $c^x$ to be detached. The three plugs must be quite independent, because for them to be fired simultaneously would involve the simultaneous ignition of the three fuses P $P^1$ T in each section of the cable, and this would involve the separation of the cable at each fitting, whereas when a ship passes between $Z^1$ and $Z^2$, the cable should be broken at Z and $Z^3$ only.

Each tape fuse P and $P^1$ in each section of the cable is also connected to the explosive charge of the cable by means of a time fuse $E^x$ (Fig. 18). Thus when the cable is struck between $Z^1$ and $Z^2$, the ignition of the fuses P and $P^1$ in the sections $Z^2$ $Z^3$, and Z $Z^1$ respectively, causes the ignition of the explosive charges in these sections, and the explosive charge in the section $Z^1$ $Z^2$ is ignited by the time fuse $z$ through the passage $z^1$ as hereinbefore described.

All the explanations which have just been given in order to show how the traction exerted by the cable D at $Z^2$ causes explosions which produce the rupture at $Z^3$ of the explosive cable and the detachment of the pendent metal cables $c^{1x}$ $c^{2x}$, might be repeated for explaining how the traction exerted upon the metal cable D which proceeds from the ship N toward $Z^1$, gives rise to explosions which produce at Z the separation of the sections of the explosive cable and detach the pendent metal cable $c^x$. It will thus be understood that a length of three sections of the cable comprised between Z and $Z^3$ is separated from the rest of the explosive cable and is carried along by the ship N, its three explosive sections being applied against the sides of the ship and containing a time fuse which is already ignited and through which the flame is conveyed and shortly afterward ignites the explosive charge located in the cable at E (Figs. 5 and 18.)

Figure 19:
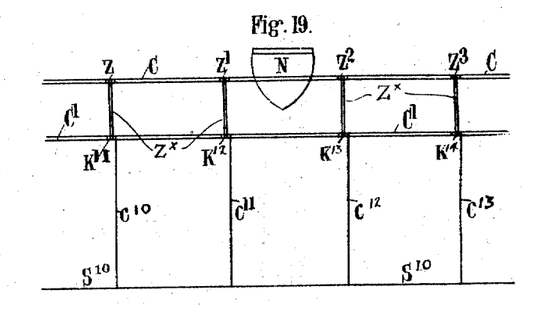
Fig. 19 illustrates diagrammatically in elevation another modified arrangement of cable.

In addition to the explosive charge E (Fig. 5) contained in the explosive cable C, another explosive charge may also be provided in a second explosive cable $C^1$ (Fig. 19) submerged about ten meters in order that this charge may be thoroughly applied beneath the ship at the moment of detonation. The entire system (either electrical or mechanical) remains the same; the charge is merely fired either by an electric conductor or by a tape fuse passing through the tube $Z^x$. The metal cables $c^{10}$ $c^{11}$ $c^{12}$ $c^{13}$ suspending the cable $S^{10}$ (Fig. 19) are disconnected at the points $K^{11}$ $K^{12}$ $K^{13}$ $K^{14}$ in a similar manner to that already described.

Figure 20:
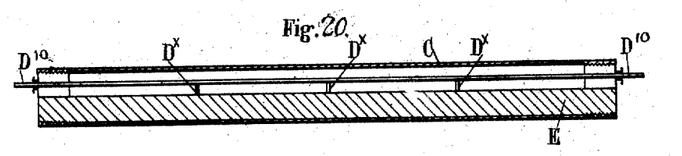
Figs. 20 and 21 are a longitudinal section and cross section respectively of a further modified form of cable adapted to be fired by hand.
Figure 21:
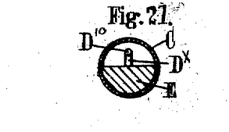

In the modified arrangement of cable shown in Figs. 20 and 21 the tube C contains the explosive charge E, the instantaneous fuse $D^{10}$ adapted to be fired by hand, and the time fuses $D^x$ which are regulated say for fifty minutes. In this simple form of the cable, one end of it would be on board ship or on land and the fuse $D^{10}$ would be ignited by hand by bringing a flame to it. It is evident that if a ship strikes this cable after the latter has been in the water forty-five minutes the explosion will recur five minutes after the cable has become applied to the ship. The explosive charge E may of course be suspended by vertical cables from a floating cable, so as to be in position for attacking large ships below their armored zone.

Whatever the method employed for effecting the separation of a particular length or section of the explosive cable may be, and whatever may be the method of rupturing the pendent metal cables and exploding the charge in the length or section of the cable carried away by the ship upon its sides, the explosive cable and its accessory parts may be wound upon a winch carried by the submarine or other vessel entrusted with the laying of the cable in front of a naval force or outside a port; the only operation necessary is to actuate this winch so as to lay the cable in the water or remove it therefrom.

What I claim and desire to secure by Letters Patent of the United States is:—

1. An explosive cable for use in naval warfare, comprising a flexible tubular casing adapted to lie horizontally in the water, explosive material carried thereby, and means for igniting the said explosive material.

2. An explosive cable for use in naval warfare, comprising a flexible tubular casing adapted to lie horizontally in the water, explosive material carried thereby, and means automatically actuated by the collision of a ship with said cable for igniting the said explosive material.

3. An explosive cable for use in naval warfare, comprising a tubular casing adapted to lie horizontally in the water, explosive material contained within said casing, means carried by said cable for causing an appropriate length or section thereof to be detached when encountered by a ship, and means for causing the explosive in the aforesaid length or section of the cable to become ignited.

4. An explosive cable for use in naval warfare, comprising a number of detachable lengths or sections, of tubular casing, explosive material contained therein, means whereby when the explosive cable is encountered by a ship a certain length of the detachable sections will be disconnected from the main portion, and means for causing the explosive in the aforesaid detached length to become ignited.

5. An explosive cable for use in naval warfare, comprising a tubular casing, explosive material carried thereby, means carried by said cable for causing an appropriate length or section thereof to be detached when encountered by a ship, means for causing the detached length of the cable to become applied to the hull of the ship beneath its armor plating, and means for causing the explosive material to become ignited.

6. An explosive cable for use in naval warfare, comprising a number of detachable tubular lengths or sections of flexible material, explosive material contained therein, metal cables arranged extensively within said tubular sections, means situated at the extremities of said metal cables whereby when the explosive cable is encountered by a ship, the consequent extension of the metal cable causes the separation of a corresponding length of the explosive cable, a steel cable suspended by its extremities to those of each of the aforesaid detachable lengths or sections of the explosive cable so as to cause the separated lengths to be applied to the hull below the armor plating, and means for causing the explosive material in the separated length of the explosive cable to become ignited.

7. An explosive cable for use in naval warfare, comprising a flexible tube composed of detachable lengths or sections, explosive material contained therein, metal cables arranged extensively within said tube, one to each detachable length or section thereof, means situated at the extremities of said metal cables and arranged so that when a ship is encountered the consequent extension of a length of metal cable causes the aforesaid means to separate a corresponding length of the explosive cable, a lower anchoring cable for connecting together the various detachable lengths or sections of the explosive cable, and intermediate vertical cables for effecting the aforesaid connection.

8. An explosive cable for use in naval warfare, comprising a flexible tube composed of detachable lengths or sections, explosive material contained therein, metal cables arranged extensibly within said tube, one to each detachable length or section thereof, fittings at the extremities of said lengths or sections for uniting them, explosive means for separating the requisite length of cable from the whole, and percussive devices for igniting the explosive separating means, said devices being actuated by the pull exerted on the aforesaid metal cable when encountered by a ship.

9. An explosive cable for use in naval warfare, comprising a flexible tube composed of detachable lengths or sections, explosive material contained therein, metal cables arranged extensibly within said tube, one to each elementary length thereof, fittings at the extremities of said lengths or sections for uniting them, metal cables suspended by their extremities between the extremities of the said lengths or sections of the cable, explosive means for separating the requisite length of cable from the whole, and percussive devices for igniting the explosive separating means, said devices being actuated by the pull exerted on the aforesaid metal cable when encountered by a ship.

10. An explosive cable for use in naval warfare, comprising a flexible tube composed of detachable lengths or sections, explosive material contained therein, metal cables arranged extensibly within said tube, one to each length or section thereof, fittings at the extremities of said lengths or sections for uniting them, intermediate vertical cables, means for connecting them to the explosive cable, a lower mooring cable connected with the explosive cable by said vertical cables, explosive means for separating the requisite length from the remaining portions of the explosive cable and from the vertical cables, and means actuated by the pull exerted on the aforesaid metal cable when encountered by ship, for igniting the explosive separating means.

11. An explosive cable for use in naval warfare, comprising a flexible tube composed of detachable lengths or sections, explosive material contained therein, metal cables arranged extensibly within said tube, one to each length or section thereof, fittings at the extremities of said lengths or sections for uniting them, a striker at each extremity actuated by the extensible cable when encountered by a ship, a cartridge for explosion by said striker, an explosive priming in each fitting opposite the cartridge of the adjacent fitting, a separating cartridge located in each of the aforesaid fittings, a tape fuse connecting the aforesaid priming with the separating cartridge, so as to cause the explosion of the latter and the consequent separation of the required length of cable at the junction of the aforesaid fittings, and a fuse for igniting the explosive material in each section of the detached length of cable.

12. An explosive cable for use in naval warfare, comprising a flexible tube composed of detachable lengths or sections, explosive material contained therein, metal cables arranged extensibly within said tube, one to each length or section thereof, fittings at the extremities of said lengths or sections for uniting them, intermediate boxes on said cable, vertical cables attached thereto, means for attaching said vertical cables as aforesaid, a lower cable connected with the explosive cable by said vertical cables, explosive means for separating the requisite length of explosive cable from the remaining portion, percussive devices for igniting the explosive separating means, said devices being actuated by the pull exerted on the aforesaid metal cable when encountered by a ship, and explosively actuated means for destroying the attaching means of the vertical cables corresponding to said separated length of cable.

13. An explosive cable comprising a flexible tubular casing, explosive material carried thereby, time fuses for igniting said explosive material, and means for starting the ignition of the time fuses.

In testimony whereof I affix my signature in presence of two witnesses.

GIOVANNI EMANUELE ELIA.

Witnesses:
T. SELBY WAEDLE,
WALTER J. SKERTEN.